(12) United States Patent
Rodman et al.

(10) Patent No.: US 10,407,155 B2
(45) Date of Patent: Sep. 10, 2019

(54) COMPOSITE SLAT CAN ASSEMBLY AND METHODS OF MAKING SAME

(71) Applicant: Aerosud Technology Solutions (Pty) Ltd., Centurion, Pretoria (ZA)

(72) Inventors: William L. Rodman, Bellevue, WA (US); Wouter T. Gerber, Pierre van Ryneveld (ZA); Jacobus Frederik Swart, Prestwick (GB)

(73) Assignee: Aerosud Technology Solutions (Pty) Ltd., Centurion (ZA)

( * ) Notice: Subject to any disclaimer, the term of this patent is extended or adjusted under 35 U.S.C. 154(b) by 141 days.

(21) Appl. No.: 15/172,964

(22) Filed: Jun. 3, 2016

(65) Prior Publication Data
US 2016/0362174 A1    Dec. 15, 2016

Related U.S. Application Data

(60) Provisional application No. 62/170,330, filed on Jun. 3, 2015.

(51) Int. Cl.
| | |
|---|---|
| *B64C 9/24* | (2006.01) |
| *B29C 70/34* | (2006.01) |
| *B29C 70/30* | (2006.01) |
| *B64C 9/02* | (2006.01) |
| *B64C 9/22* | (2006.01) |
| *B29C 70/08* | (2006.01) |
| *B29C 65/00* | (2006.01) |

(Continued)

(52) U.S. Cl.
CPC .............. *B64C 9/24* (2013.01); *B29C 66/494* (2013.01); *B29C 70/086* (2013.01); *B29C 70/30* (2013.01); *B29C 70/34* (2013.01); *B29C 70/342* (2013.01); *B64C 7/00* (2013.01); *B64C 9/02* (2013.01); *B64C 9/22* (2013.01); *B29K 2105/0845* (2013.01); *B29K 2905/00* (2013.01); *B29L 2031/3076* (2013.01)

(58) Field of Classification Search
CPC ......... B29C 51/10; B29C 51/28; B29C 70/02; B29C 70/30; B29C 70/34; B29C 70/342; B29C 70/345; B29C 70/347; B29C 70/44; B29C 70/443; B29C 70/446; B29C 70/543; B64C 9/24; B64C 9/22; B64C 9/02; B64F 5/10; B64F 5/00
See application file for complete search history.

(56) References Cited

U.S. PATENT DOCUMENTS

| | | | |
|---|---|---|---|
| 4,399,970 A | 8/1983 | Evans | |
| 8,424,807 B2 * | 4/2013 | Sutton | B29C 43/12 244/123.1 |

(Continued)

FOREIGN PATENT DOCUMENTS

| | | |
|---|---|---|
| EP | 0501831 A1 | 2/1992 |
| WO | 2010122324 A2 | 10/2010 |

*Primary Examiner* — Philip J Bonzell
(74) *Attorney, Agent, or Firm* — Williams, Kastner & Gibbs PLLC; Mark Lawrence Lorbiecki (57) ABSTRACT

A slat can assembly with a slat can body includes at least one full ply of a composite fiber sheet material and a plurality of elongated, unidirectional fiber ply strips that are arranged into the shape of the slat can body. At least some of the unidirectional fiber ply strips are laid over the full ply. And, the full ply and the elongated, unidirectional fiber ply strips cooperate to provide a contoured shape defined by a cellular core member.

20 Claims, 7 Drawing Sheets

(51) Int. Cl.
 *B64C 7/00* (2006.01)
 *B29K 105/08* (2006.01)
 *B29L 31/30* (2006.01)

(56) References Cited

U.S. PATENT DOCUMENTS

| | | | |
|---|---|---|---|
| 8,967,551 B2 * | 3/2015 | Parker | B64C 9/22 |
| | | | 244/203 |
| 9,016,636 B2 * | 4/2015 | Parker | B64C 9/02 |
| | | | 244/214 |
| 9,248,903 B2 * | 2/2016 | Eden | B64C 3/28 |
| 2010/0258674 A1 | 10/2010 | Sutton | |
| 2016/0167766 A1 * | 6/2016 | Brakes | B64C 9/00 |
| | | | 244/99.2 |

* cited by examiner

COMPOSITE SLAT CAN ASSEMBLY AND METHODS OF MAKING SAME

PRIORITY CLAIM

This application claims the benefit of U.S. Provisional Application No. 62/170,330, filed on Jun. 3, 2015, and the subject matter of which is hereby incorporated by reference in its entirety.

FIELD OF THE INVENTION

The present invention is generally directed to a composite slat can assembly, and more specifically directed to a composite slat can assembly and methods of making the same.

BACKGROUND

Commercial and general aviation aircraft often utilize high lift devices called leading trailing edge devices, or slats and flaps, respectively. A slat forms the leading edge of an aircraft wing and may be controllably commanded to extend and retract during takeoff and landing to increase lift during low speed flight. A flap forms the trailing edge of the aircraft wing and may be controllably commanded to extend or retract during takeoff and landing to increase lift. Typically, the slat has two configurations which are "deployed" or "stowed." Flaps, on the other hand, may have multiple configurations or "detents," which means the flap extends to various detents with each extension progressively giving the wing a greater surface area. When the flap is fully retracted it is considered to be in the "stowed" position. FIGS. 1A-1E show a cross-sectional view of an aircraft wing 10 with a flap system 20 and a slat system 30, in which each system is shown in various configurations as described above.

Figures 1A, 1B, 1C, 1D, 1E:
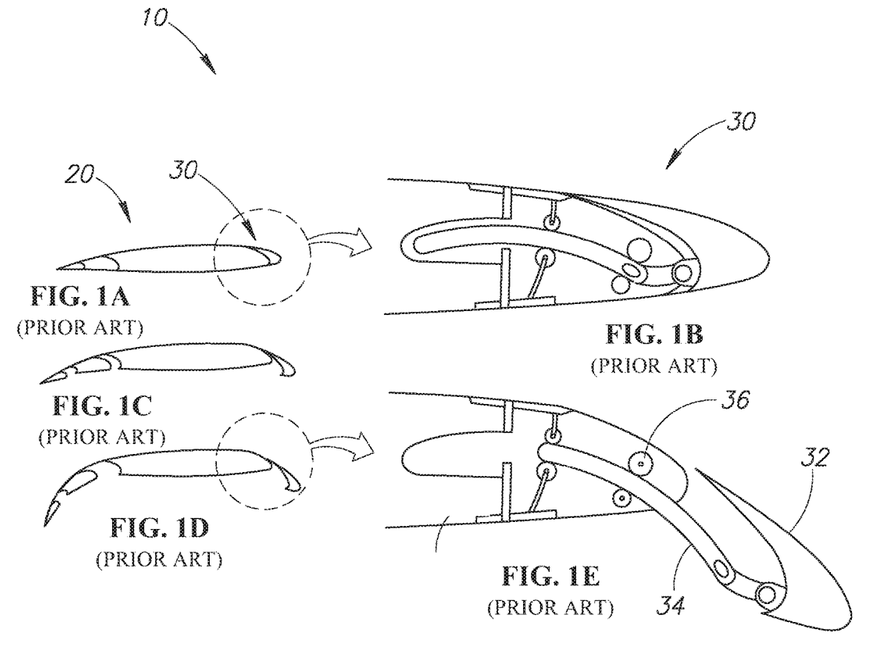
FIGS. 1A-1E are prior-art representations showing actuation of a an airplane leading and trailing edge system.
Figure 2:
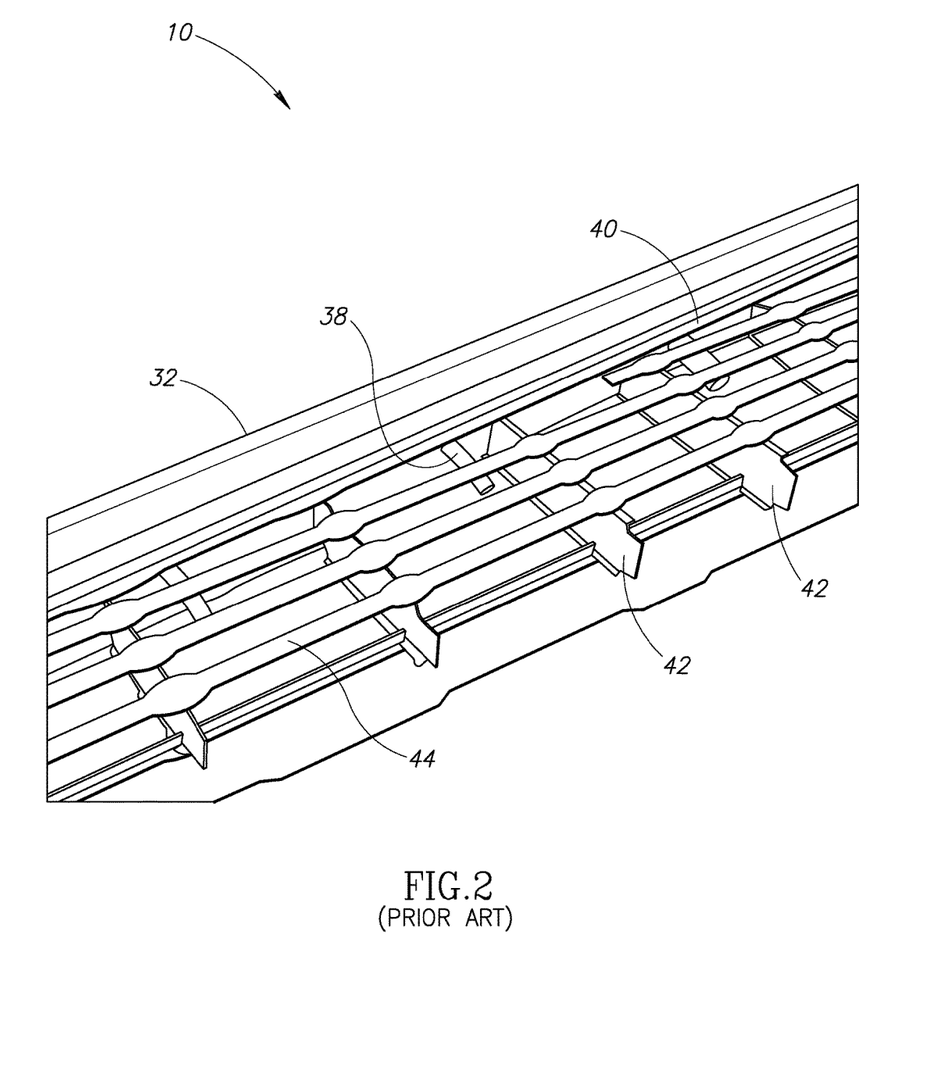
FIG. 2 is a schematic, perspective, prior-art view of an airplane wing with a top wing panel removed to show a wing front spar and a slat can assembly attached thereto.

The slat system 30 includes a slat 32, a track 34, guide rollers 36 and a penetration 38 in the front spar 40. For purposes of orientation and completeness, ribs 42 are shown with stringers 44 in place. During retraction, the track 34 extends into the penetration 38, which is sealed with a "slat" or "track" can (FIG. 2). One purpose of the slat can is to prevent fuel leakage from a wing fuel tank (not shown) through the front spar 40.

Fleet experience has found that slat cans can collect water due to condensation or other types of moisture ingress. Therefore, conventional slat cans may need to be periodically drained to function properly. In at least one instance, the slat track has been damaged during retraction due to ice buildup within the slat can combined with inadequate drainage of moisture from the slat can, and where the track eventually drove the built-up ice through an aft wall of the slat can. Conventional certification, safety and maintenance guidelines include a functional test to verify the slat system can withstand drain failure and ice buildup.

Conventional slat cans are typically made from either cast or welded aluminum. Cast slat cans are made using investment casting techniques that are well known in the industry. Welded slat cans utilize machined or pre-formed metallic details that are pieced together in a tooling jig and subsequently welded. It should be appreciated that welding and casting processes for primary aircraft structure (described below) require significant x-ray, penetrant, and other inspection methods to verify porosity levels and acceptability at the production level, as well as periodic inspections over an operational life of the slat system. It is well known that metallic casting and welding processes are susceptible to porosity, and that both processes may generate undesired scrap rates.

The difference between primary structure and secondary or non-structural components is that primary structure must be certified to sustain design ultimate flight and ground loads. Primary structural components contribute significantly to carrying flight, ground, and pressurization loads, and whose failure could result in catastrophic failure of the airplane. Components classified as primary structure must, at least in they United States, be designed with an ultimate safety factor and a level of damage tolerance that maintains a threshold amount residual strength, fail safe ability, and limited crack growth rates for the operational life of the airplane.

Components that are not classified as primary structure are either classified as secondary structure or non-structural, which means they are not considered essential to safe flight. Loss of these components could result in benign functional issues, such as a partial loss of air conditioning or a malfunctioning overhead bin latch, for example. It follows that the processes that govern the manufacture and maintenance of secondary and non-structural components are, by definition, less stringent and generally not acceptable for producing primary structural components.

By way of example, manufacturing processes for producing reinforced composite or plastic secondary or non-structural elements may include, but are not limited to, keyed metallic internal tooling, metallic external tooling with a bladder, resin transfer molding (RTM), plaster, salt or dissolvable foam mandrel layup, vacuum bag layup. However, each of these processes have drawbacks such as, but not limited to, ply wrinkling, undesired ply compaction during cure, ply location accuracy, resin rich regions.

With exception of RTM, the above processes either utilize internal tooling with a vacuum bag, or external tooling with no way to control ply location. In the case where internal tooling is used, the plies compact against a hard tool and wrinkles form. The size of the wrinkles can be modeled by calculating the difference in compaction from the uncured ply thickness to the "as cured" ply thickness.

In the case where an external tool is used with a bladder or silicone bag, internal plies need to be accurately located and laid inside the tool or mold, which makes these processes unfit for an airplane production environment where close tolerances and consistency is required.

For the RTM process, plies are laid on keyed metallic inserts and then inserted into a metallic mold. In this case, tolerance between the keyed metallic inserts has to be closely maintained to the point where it is unrealistic to expect repetitive tolerances in the airplane production environment. Once the tolerances are out of specification, either due to resin build up on the pieces, or tool wear, or, if they were improperly designed or fabricated in the first place, then excess resin pools in the openings, or plies are pinched in the narrowed sections. In the first case, resin micro cracking can lead to a failure. In the second case, the plies are weakened and not suitable for the requisite structural loads.

BRIEF SUMMARY

In at least some aspects of the present invention, a slat can assembly having a slat can body, the slat can assembly comprising: at least one full ply of a composite fiber sheet material; and a plurality of elongated fiber ply strips arranged into a shape of at least the slat can body, wherein at least some of the elongated fiber ply strips are laid over the at least one full ply, and wherein the at least one full ply and the plurality of elongated fiber ply strips cooperate to provide a contoured shape defined by a cellular core member.

In at least other aspects of the present invention, a method of making a composite assembly includes the steps of (1) obtaining a contoured cellular core member having an internal, pressurizable volume; (2) applying a plurality of elongated fiber ply strips circumferentially around the cellular core member to form a pre-cured composite assembly; (3) placing the pre-cured composite assembly into a mold; (4) pressurizing the internal volume of the cellular core member; and (5) curing the pressurized, pre-cured composite assembly to form a final composite assembly.

BRIEF DESCRIPTION OF THE DRAWINGS

Preferred and alternative embodiments of the present invention are described in detail below with reference to the following drawings.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with composite structures, the tooling to produce the same, and methods of making, configuring and/or operating any of the above have not necessarily been shown or described in detail to avoid unnecessarily obscuring descriptions of the embodiments of the invention.

The present invention is generally directed to the leading edge system for aerospace vehicles, and more specifically directed to slat cans of the leading edge system. U.S. Pat. Nos. 8,834,782 and 8,337,740; and U.S. Patent Publication Nos. 2015/0151481; 2015/0114548; 2013/0299061; 2013/0174972; and 2009/0208683 provide various descriptions regarding pressurizable members (also referred to herein interchangeably as "cellular cores" or "inner tool") and how the inner tools may be arranged to produce complex-shaped composite assemblies and/or structures, and each of the aforementioned patents and patent applications are hereby incorporated by reference in their entireties. The present invention may also overcome some of the problems related to manufacturing customized, complex shaped slat cans that meet structural load requirements and provide at least some weight advantage as compared to conventional, metal slat cans. In some other embodiments, the present invention may be directed to other structures such as, but not limited to, jet engine inlets, ram air inlet ducts, auxiliary power unit (APU) ducts, and other types of engine ducts.

In at least some embodiments, the use of reinforced composite materials may advantageously provide for better performance and customization as compared to conventional slat cans. Composite materials are typically strong, durable, non-corrosive and difficult to pierce. Additionally or alternatively, a composite slat can may reduce or prevent galvanic corrosion when a carbon fiber composite aircraft wing or spar is present, which is another advantage over conventional metallic slat cans. Generally, a composite slat can would provide a weight savings due to a lower material density than metal. Additionally or alternatively, a substantial weight savings may be possible by customizing the shape of the composite slat can by tailoring ply build ups; whereas customizing the shape of a conventional metal slat can is difficult, if not impossible due to cost and forming limitations. Lastly, the composite slat cans may allow for specialized connections to a drain system. At least one or all of these potential advantages will be appreciated from the following description.

Figure 3:
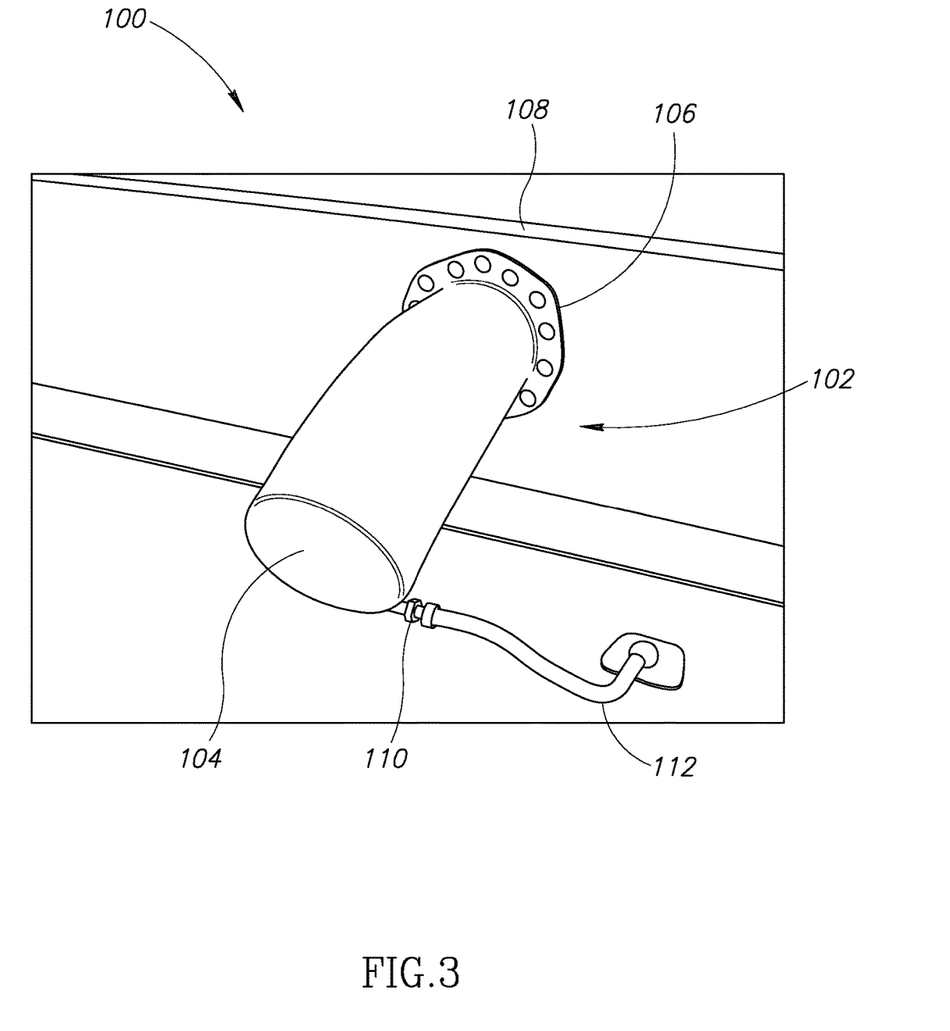
FIG. 3 is a schematic, perspective view of a slat can assembly attached to a wing front spar according to an embodiment of the present invention.

FIG. 3 shows a schematic, perspective view of a fuel barrier membrane installation 100. For purposes of brevity and clarity, the fuel barrier membrane installation 100 will be referred to as a slat can installation hereinafter. A slat can 102 includes a slat can body 104 and a mounting flange 106, which is coupled to a front spar 108. The slat can installation 100 further includes a drain plug 110 and a drain hose or tube 112. The slat can body 104 may be generally shaped in a curved, cylindrical manner, but a variety of other different or customized shapes are possible in conjunction with aspects of the present invention. The internal volume of the slat can body 104 accommodates the kinematic motion of the slat track 34 (FIGS. 1A-1E) as it moves from an undeployed position to a deployed position, and vice-versa.

Figure 4:
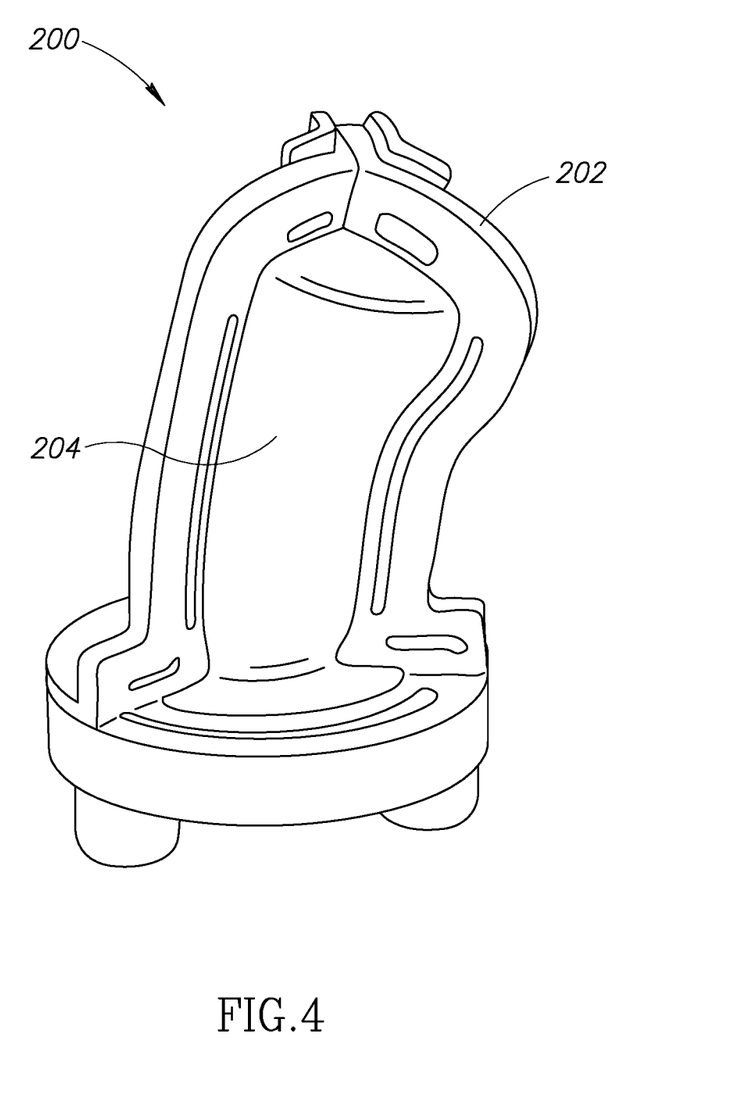
FIG. 4 is a schematic, side-elevational, representation of a tooling system for manufacturing a composite slat can assembly according to an embodiment of the present invention.

FIG. 4 shows a side-elevational, schematic, perspective view of a tooling system 200 used to make a slat can assembly. For purposes of brevity, an outer tool 202 and an inner tool 204 are shown together, but it is appreciated that the inner tool 204 is illustrated without any fiber plies thereon so that the interaction of the outer tool 202 and the inner tool 204 may be more clearly visualized. In practice, however, the inner tool 204 would be laid up with one or more layers of fiber plies before being placed into the outer tool 202.

The outer tool 202 takes the form of a metallic, composite mold. In at least some embodiments, the metallic mold 202 is made of invar, steel, aluminum, or other suitable material, some combination or variety thereof, or any type of material where the coefficient of thermal expansion (CTE) can be taken into account. For example, invar molds may be utilized where high dimensional stability is required because invar has a low CTE.

The inner tool 204 takes the form of a pressurizable member, which is hereinafter referred to as a cellular core 204. In a preferred embodiment, the cellular core 204 is a hollow rotationally molded thermoplastic member, a blow molded thermoplastic member, a superplastic formed metallic member, or a twin sheet vacuum formed (TSVF) member having an opening or vent. The cellular core 204 is significantly more rigid than a composite vacuum bag, which is typically made from a thin sheet of nylon or other flimsy material. The cellular core 204 may include an opening or vent (not shown) that allows an inner surface of the cellular core to be vented or pressurized such that it is expanded or inflated against one or more layers of fiber plies after they have been applied onto the cellular core 204 (discussed in more detail below).

Advantageously, the vented cellular core allows for the manufacture of complex-shaped, three-dimensional fiber reinforced composite structures to be produced using elevated temperatures, pressures, autoclave or pressurized press techniques. By means of the opening, pressure within the cellular core may be equalized as temperature rises or additional pressure may be applied, as in the use of an autoclave or pressurized press. By positively pressurizing the inner volume of the cellular core 204, the cellular core 204 is forced to expand, by even the slightest amount, such that the cellular core 204 is urged against un-cured fiber plies to compress and sandwich the fiber plies between the cellular core 204 and the mold 202. This ply compression operates to mitigate wrinkle formation in the final, assembled part (e.g., the slat can assembly). In at least some embodiments, the cellular core 204 expand uniformly to place the fiber plies in tension, which tends to reduce or prevent wrinkles in the final, assembled part.

In at least one embodiment, the cellular core 204 may be produced from a chemically pure titanium tube that is super plastically formed to create a metal matrix composite shape. In another embodiment, the cellular core 204 is produced using a process commonly referred to as selective laser sintering, which is a process that uses a high power laser to rapidly fuse small particles of plastic, metal, or ceramic powders into a mass representing a desired three-dimensional object. The process selectively fuses the small particles after successively reading cross-sectional data generated and defined by a three-dimensional representation of the component to be manufactured. The cellular core is produced by successively layered thicknesses of the small particles, where each new layer is applied on top of the previous layer until the component is complete. In at least another embodiment, the cellular core 204 may be produced by three-dimensional or additive printing techniques.

In at least one embodiment, a plurality of the cellular cores 204, which may be of different sizes and have varying, complex shapes, may be arranged to form a large, complex-shaped lay-up surface for the fiber plies. By way of example, the slat can 102 (FIG. 3) may be formed using one or more cellular cores 204.

Figure 5:
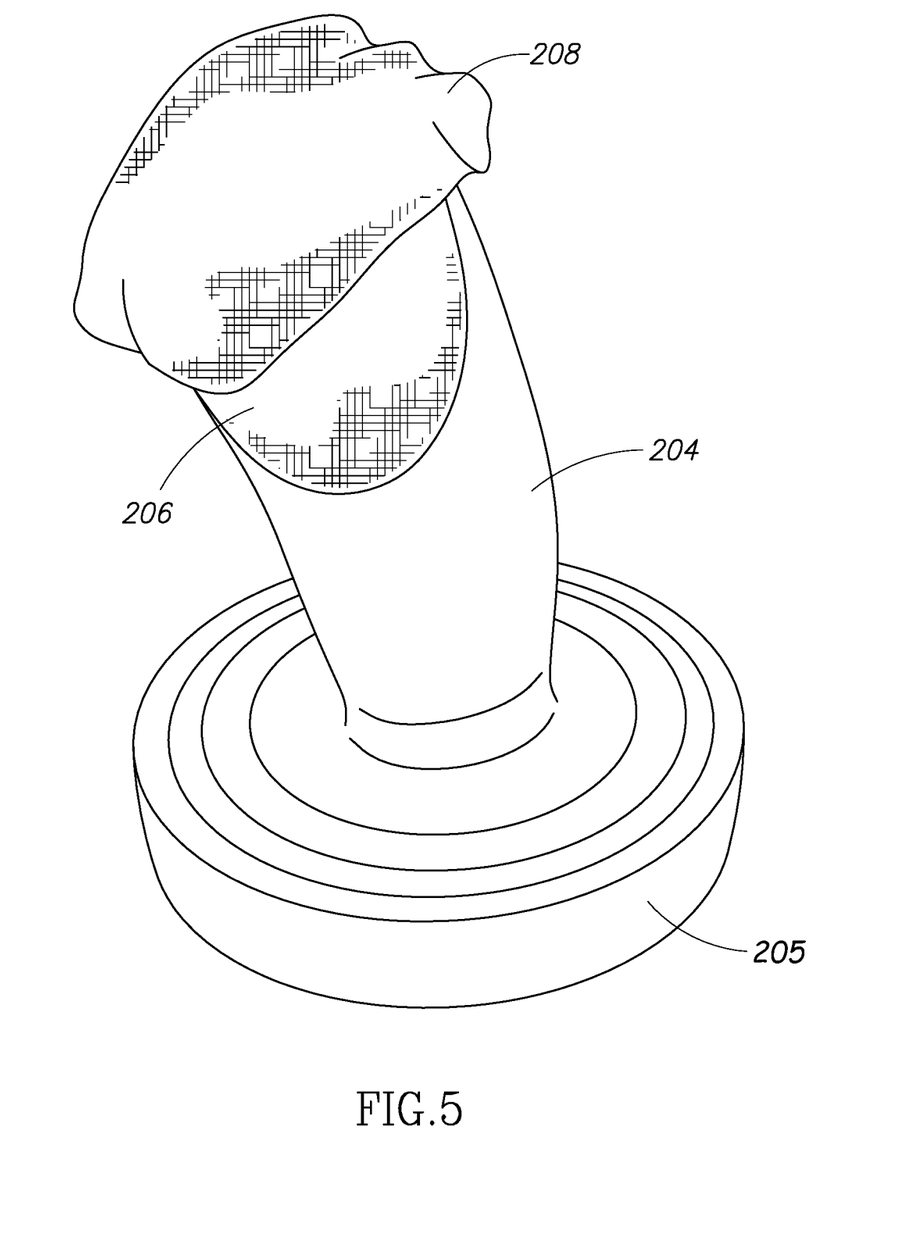
FIG. 5 is a schematic, perspective view showing several steps of a layup process on a cellular core member to make a composite slat can assembly according to an embodiment of the present invention.

FIG. 5 shows several initial steps for making a slat can assembly. In at least some embodiments, manufacturing a slat can assembly includes using a single, cellular core 204, described above, that operates as a platform or support to control the application, location or layup of fiber plies onto the cellular core 204. In at least one embodiment, the shape of the cellular core 204 defines the shape of the slat can assembly while the layup of fiber plies, as will be described below, determines the functional, structural, and spatial capability of the slat can assembly.

The cellular core 204, having been made to a desired configuration, is placed on a platform 205 for stabilization. Optionally, one or more doubler plies 206 are placed or laid onto the cellular core 204. In at least some embodiments, the doubler ply 206 provides localized strength to a region of the slat can assembly. The doubler ply 206 may take the form of a woven, multi-directional ply or a unidirectional ply; either of which may depend on a variety of factors such as, but not limited to, the final configuration of the slat can assembly, the anticipated loads, the inboard/outboard location on the front spar, etc.

Next, one or more full plies 208 are placed or laid onto the cellular core 204, whether directly onto a surface of the cellular core or onto one or more doubler plies 206. Like the number of doubler plies and for at least the factors expressed above, it is optional as to how many full plies 208 are to be laid onto the cellular core 204. A full ply 208 may take the form of a multi-directional or a unidirectional ply. In a preferred embodiment, the full plies 208 are woven, multi-directional plies that are be pre-impregnated with resin.

Figure 6:
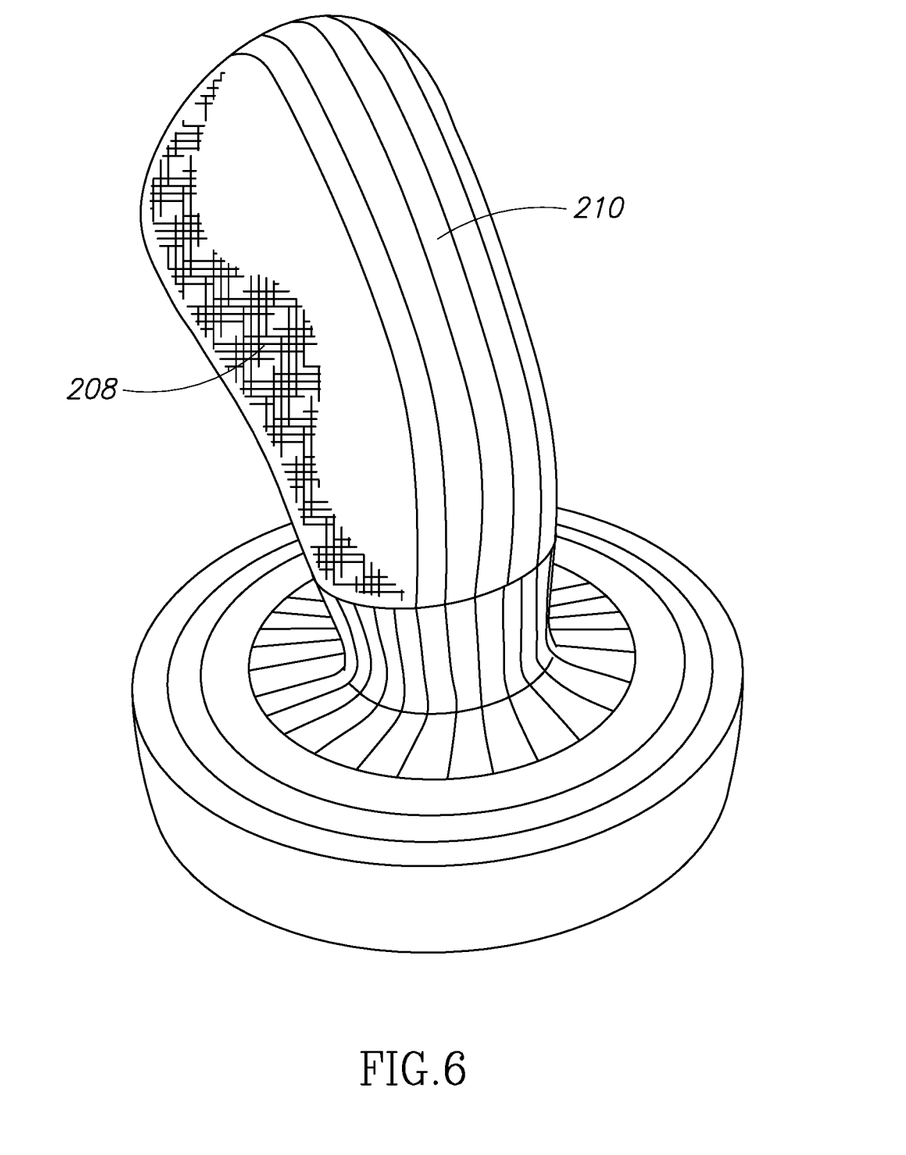
FIG. 6 is a schematic, perspective view showing a layup process where elongated, unidirectional fiber ply strips are applied to a cellular core member according to an embodiment of the present invention.

FIG. 6 shows a schematic, perspective view of a slat can assembly during a final ply layup process. In the illustrated embodiment, an outer layer of plies 210 take the form of elongated (e.g., narrow), unidirectional ply strips. In at least some embodiments, the unidirectional ply strips 210 may be compacted together using a reinforcement material instead of woven together. The reinforcement material may take the form of either a thermoplastic or thermoset resin. At least one advantage of using the unidirectional ply strips 210 is that a pair of adjacent unidirectional ply strips 210 can be held or kept together by the tackiness or stickiness of the reinforcement material. When the unidirectional ply strips 210 are applied in pairs, this can reduce the total number of laid down plies by half, which may beneficially save time and labor during the fiber layup process. The unidirectional ply strips 210 are able to follow highly contoured features, such as the flange and crown regions of the cellular core member, without substantially distorting the unidirectional ply strips 210. Using a wider fiber ply would likely cause distortions, wrinkles, creases, or generate some other undesirable feature that may reduce strength, functionality, surface finish, or some other design aspect.

In at least some embodiments, a method for making a slat can assembly includes the steps of (1) obtaining a contoured cellular core member having an internal, pressurizable volume; (2) applying at least one full fiber ply sheet onto the cellular core member; (3) applying a plurality of elongated, unidirectional fiber ply strips circumferentially around the cellular core member to form a pre-cured slat can assembly; (4) optionally applying a final full woven fiber ply sheet onto the laid up cellular core (5) placing the pre-cured slat can assembly into a mold, which is configured to be complementarily shaped with regard to the cellular core member; (6) pressurizing the internal volume of the cellular core member; and (7) curing the pressurized, pre-cured slat can assembly to form a final slat can assembly.

In at least one embodiment, a doubler ply may be applied onto the cellular core member to provide for localized strength.

In yet another embodiment, the elongated, unidirectional fiber ply strips 210 include are applied in pairs in which a first strip includes fibers oriented in a first direction and a second, adjacent strip includes fibers oriented in a second direction that is different from the first direction. Additionally or alternatively, the second direction may be perpendicular to the first direction.

In still yet another embodiment, pressurizing the internal volume of the cellular core member includes providing a positive pressure greater than one atmosphere.

Figure 7:
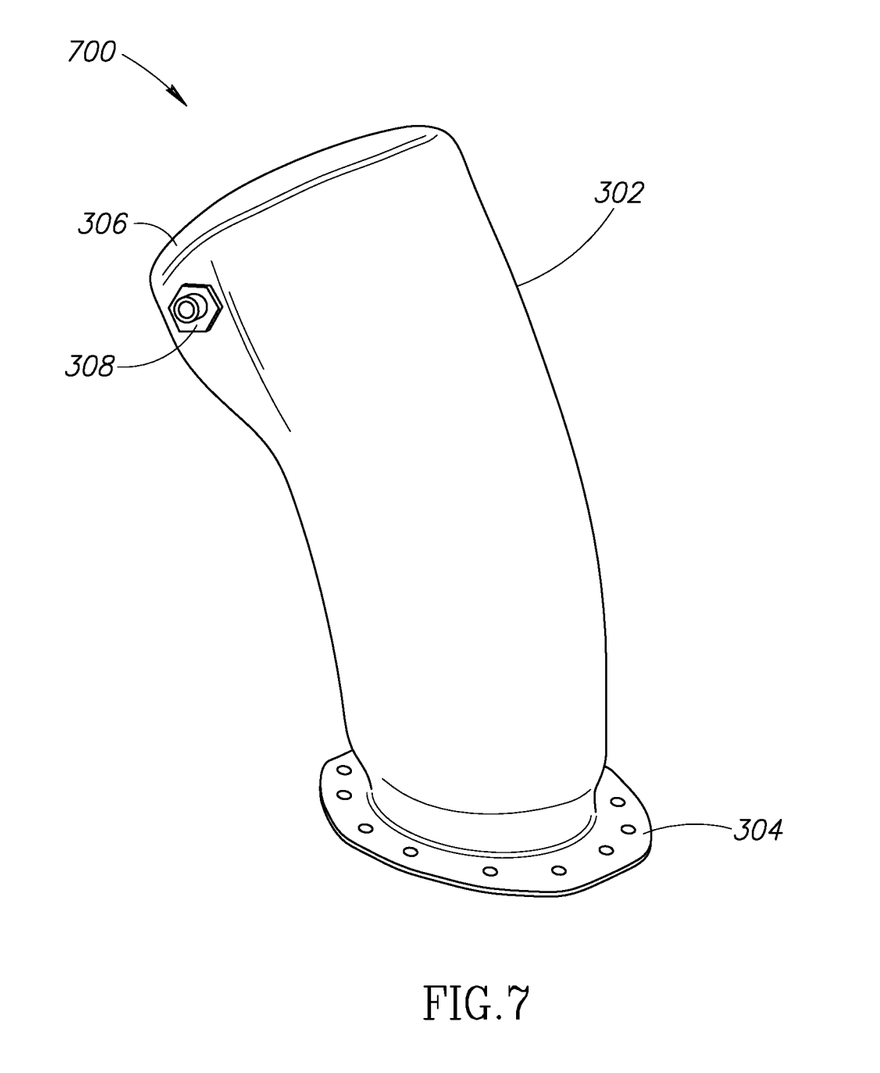
FIG. 7 is a schematic, perspective view of a final, composite slat can assembly with a drain extension according to an embodiment of the present invention.

FIG. 7 shows an embodiment of a final slat can assembly 300 in accordance with one or more embodiments of the present invention. The slat can assembly 300 includes a slat can body 302, a mounting flange 304 and a protuberance or extension 306 configured to receive a drain plug 308. The complex and customized shape of the illustrated slat can assembly 300 would not be possible if made out of metal.

While preferred embodiments of the invention have been illustrated and described, as noted above, many changes can be made without departing from the spirit and scope of the invention. In addition, other advantages will also be apparent to those of skill in the art with respect to any of the above-described embodiments whether viewed individually or in some combination thereof. Accordingly, the scope of the invention is not limited by the disclosure of the preferred embodiment. Instead, the invention should be determined entirely by reference to the claims that follow.

What is claimed as new and desired to be protected by Letters Patent of the United States is:

1. A method of forming a slat can, the method comprising:
   obtaining an cellular core (204) defining a pressurizable member, the pressurizable member being configured to expand the cellular core (204) when suitably pressurized with a positive pressure; the cellular core (204) being further configured to receive and support, prior to full pressurization, during the formation of a slat can:
      at least one full ply (208) of a composite fiber sheet material to enclose the cellular core (204) prior to pressurization with positive pressure; and
      a plurality of elongated fiber ply strips (210) arranged to cover the cellular core (204), wherein at least some of the elongated fiber ply strips are laid over cellular core (204), the cellular core being sufficiently rigid to support the plurality of fiber ply strips prior to pressurization of the pressurizable member with positive pressure;
   applying the plurality of elongated fiber ply strips (210) around the cellular core member;
   applying the at least one full ply (208) of the composite fiber sheet material to enclose the cellular core (204), the cellular core, the plurality of elongated fiber ply strips, and the at least one full ply to form a pre-cured composite assembly;
   placing the pre-cured composite assembly into an outer tool (202) defining an inner surface mold to form a surface of the slat can;
   pressurizing the internal volume of the pressurizable member, such that upon pressurization the cellular core (204) expands to urge the cellular core (204) against the plies to compress and sandwich the fiber plies between the cellular core tool (204) and the outer tool (202); and
   curing the pressurized, pre-cured composite assembly to form the slat can.

2. The method of claim 1, wherein obtaining the cellular core (204) member includes obtaining the inner tool (204) member having a protuberance extending from the cellular core (204) the protuberance being configured to form a corresponding protuberance (306) in the finished slat can to accommodate a drain plug.

3. The method of claim 1, wherein placing the pre-cured composite assembly into the mold includes placing the pre-cured composite assembly into a metallic mold with a known coefficient of thermal expansion.

4. The method of claim 1, wherein pressurizing the internal volume of the cellular core member includes providing a positive pressure greater than one atmosphere.

5. The method of claim 1, further comprising applying one of either a full fiber ply or a doubler ply onto the cellular core member.

6. The method of claim5, wherein at least one of either the full fiber ply or the doubler ply is a woven ply.

7. The method of claim 1, applying the plurality of elongated fiber ply strips includes applying the strips in pairs, wherein a first strip includes fibers oriented in a first direction and a second, adjacent strip includes fibers oriented in a second direction, which is different from the first direction.

8. The method of claim 7, wherein the second direction is perpendicular to the first direction.

9. A tooling system (200) to produce a slat can comprising:
   an outer tool (202) defining an inner surface mold to form a surface of the slat can;
   an cellular core (204) defining a pressurizable member, the pressurizable member being configured to expand when suitably pressurized with a positive pressure; the cellular core (204) being further configured to receive and support prior to full pressurization with positive pressure, in use during the formation of a slat can:
      at least one full ply (208) of a composite fiber sheet material; and
      a plurality of elongated fiber ply strips (210) arranged into a shape of at least the slat can body, wherein at least some of the elongated fiber ply strips are laid over the at least one full ply, and
   wherein the at least one full ply (208) and the plurality of elongated fiber ply strips (210) cooperate to provide a contoured shape defined by the outer tool (2021), and enclosing the cellular core in nesting arrangement, when, upon pressurization the inner tool (204) expands such that the inner tool (204) is urged against the plies to compress and sandwich the fiber plies between the cellular core (204) and the outer tool (202) when so assembled.

10. The tooling system of claim 9, wherein the cellular core (204) is produced from a chemically pure titanium tube that is super plastically formed to create a metal matrix composite shape.

11. The tooling system of claim 9, wherein the inner tool (204) is produced using selective laser sintering.

12. The tooling system of claim 9, wherein the at least one full ply is at least one dry full ply infused with resin.

13. The tooling system of claim 9, wherein the plurality of elongated fiber ply strips are arranged to form a contoured, cylindrical body with one end closed.

14. The tooling system of claim 9, wherein the plurality of elongated fiber ply strips are arranged in pairs, wherein a first strip includes fibers oriented in a first direction and a second, adjacent strip includes fibers oriented in a second direction, which is different from the first direction.

15. The tooling system of claim 14, wherein the second direction is perpendicular to the first direction.

16. The tooling system of claim 9, wherein the cellular core (204) is further configured to receive and support a doubler ply arranged at least partially beneath the at least one full ply.

17. The tooling system of claim 16, wherein the doubler ply is a woven ply.

18. The tooling system of claim 16, wherein the doubler ply is pre-impregnated with resin.

19. The tooling system of claim 9, each of the cellular core (202) and the outer tool (204) further comprise a protuberance extending from the cellular core (204), the protuberance being configured to form a corresponding protuberance (306) in the finished slat can.

20. The tooling system of claim 19, wherein the corresponding protuberance (306) is configured to be coupled to a drain plug.

* * * * *